United States Patent [19]
Yu

[11] Patent Number: 5,413,219
[45] Date of Patent: May 9, 1995

[54] EASY OPENING CASE

[76] Inventor: Chiao-Mei Yu, No. 145, Sec. 2, Chung Shan Rd., Ta Tsuen Hsiang, Chang-Hua Hsien, Taiwan, Prov. of China

[21] Appl. No.: 245,531

[22] Filed: May 18, 1994

[51] Int. Cl.6 ........................................... B65D 85/672
[52] U.S. Cl. .................. 206/387.1; 206/309; 206/1.5
[58] Field of Search ............... 206/387, 309, 310, 311, 206/312, 313, 444, 1.5

[56] References Cited

U.S. PATENT DOCUMENTS

| | | | |
|---|---|---|---|
| 4,067,629 | 1/1978 | Amatsu et al. | 206/387 X |
| 4,428,480 | 1/1984 | Ackeret | 206/387 |
| 4,678,245 | 7/1987 | Fouassier | 206/387 X |
| 5,012,922 | 5/1991 | Nehl | 206/387 |

Primary Examiner—Jacob K. Ackun
Attorney, Agent, or Firm—Bacon & Thomas

[57] ABSTRACT

This invention is an easy opening case, when taking something (e.g. tape cassette) out of the case, it is enough to use a single hand to open it. Besides, the case has a function of preventing itself from being opened by mistake. It mainly consists of a positioning hook on one side of its cover, corresponding to the hook, there disposed a positioning block on the wall of the base, the positioning block is an "L" shaped, elastic, movable coupled moving lug; when the case is closed, the hook just retains the positioning block so as to have a function of preventing the cover from being opened by mistake. When it is open for a user to take out an object in it, it is enough to use a single hand to handle it; that is, use the thumb to push the coupled moving lug, and use other fingers to pull the cover so that the positioning hook can get off the positioning block and the cover can be easily opened by a single hand. So the presennt invention has completely changed the structure of the conventional type of tape casstte. Besides, it is more functional in utility.

4 Claims, 10 Drawing Sheets

FIG1(PRIOR-ART)

EASY OPENING CASE

BACKGROUND OF THE INVENTION

This invention relates to an easy opening case, particularly to a music tape cassette which can be opened by only one hand and has a retainer to prevent the case being opened by mistake and the tape being dropped off. The present invention makes a complete improvement on the conventional type of cassette which has a defect that it has no retainer and must be opened by two hands. The whole structure of the present invention does not become complex because of the above improvement and its cost does not increase, either.

Figure 1:
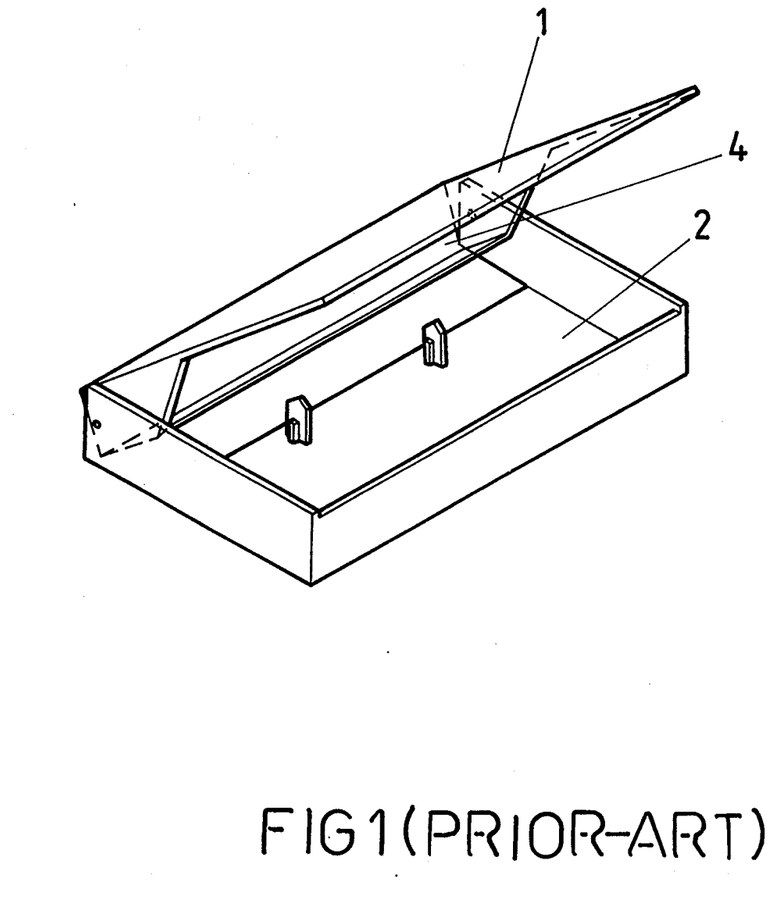
FIG. 1 is a pictorial schematic view of a conventional cassette.

The conventional music tape cassette as shown in FIG.1 has a cover 1 on a recess 4. The cover 1 is directly combined to the cassette 2. Its situation in use can be described as follows: the music tape is put in the recess 4, and then push the cover 1 onto the cassette holder and close the cassette. When taking the tape out, use your left (or right) hand to hold the cassette 2 and use your right (or left) hand to lift the cover 1 and open it. Although the structure of this type of cassette 2 is simple, it has the following defects:

1. When taking the tape out, you must use two hands to handle it because its structure has no other auxiliary. And this is a kind of inconvenience.

2. When the cassette is closed, its structure has no fastening restriction between cover I and cassette 2, so the cover 1 may be lifted by mistake on account of outside factors and the tape may drop out.

Although the conventional type of cassette has an advantage that its structure is simple, yet it has the disadvantages said above. After the inventor of the invention has done some studies and experiments, the cassette structure which can be handled by one hand and has a retaining restriction to prevent it from tropping off when it is opened by mistake. The present invention is more practical and has overcome the defects of the conventional type.

BRIEF DESCRIPTION OF THE DRAWINGS:

FIB. 7B is a view similar to FIG. 7A in an open position.

DETAILED DESCRIPTION OF THE PREFERRED EMBODIMENTS

Figure 2:
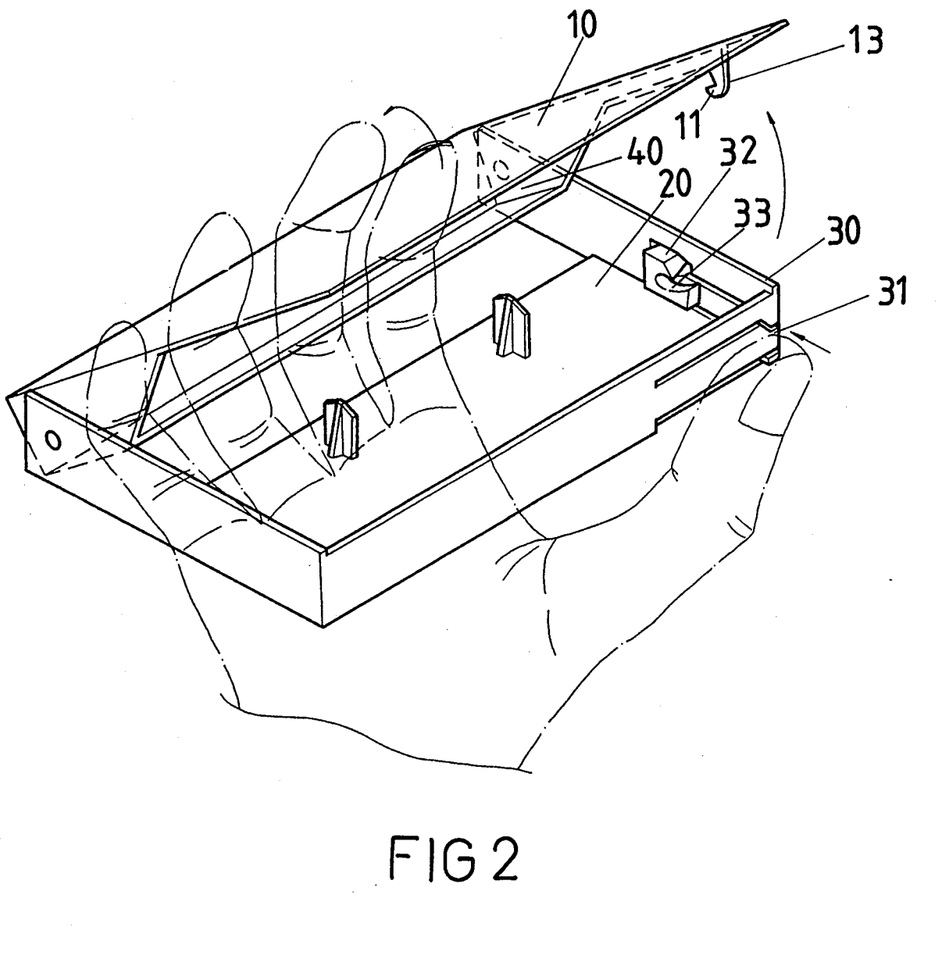
FIG. 2 is a pictorial schematic view of the invention in use.
Figure 3:
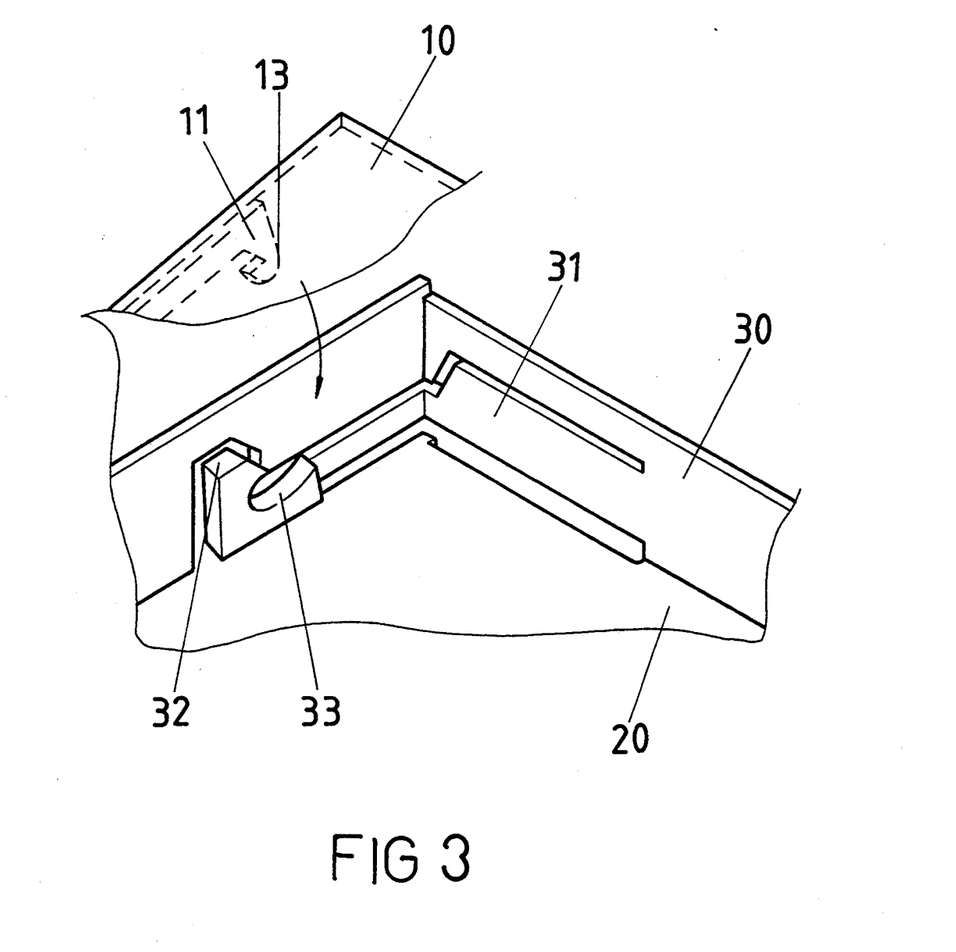
FIG. 3 is a pictorial schematic view of a positioning hook and a positioning lug of the invention.

Now referring to FIG.2, 3, a cover 10 with a recess 40 is combined to a case 20. The improvements made on the present invention are as follows: one side of the cover has a convex positioning hook 11; a coupled moving lug 31 which is shaped according to a case wall 30 is disposed at a corner on the case wall 30 corresponding to the position of the positioning hook 11; the coupled moving lug 31 is elastic and one end of the lug 31 is molded to become a hook-shaped positioning block 32 with a slant pushing surface 33 by injection moulding; the volume of block 32 is a little larger than the hook 11.

Figure 4A:
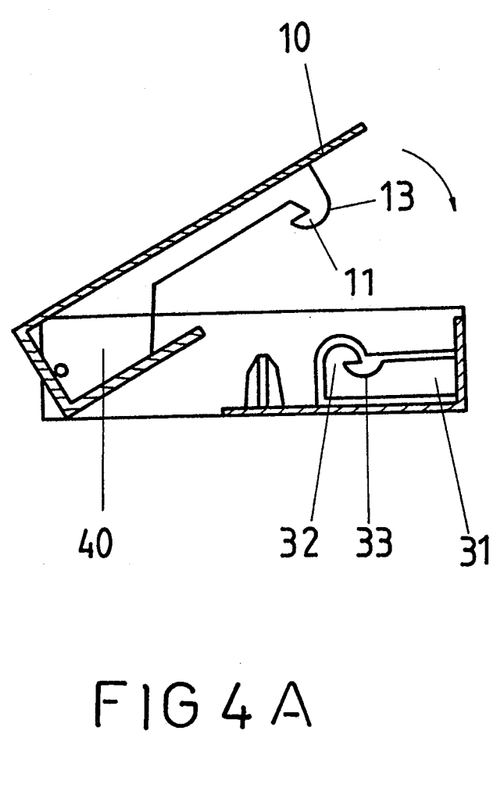
FIG. 4A is a schematic (side) view of the invention in an open position.
Figure 4B:
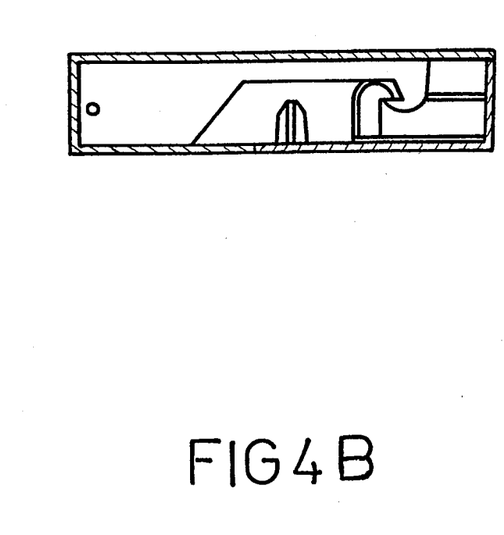
FIG. 4B is a side view of the invention in a closed position.
Figure 5:
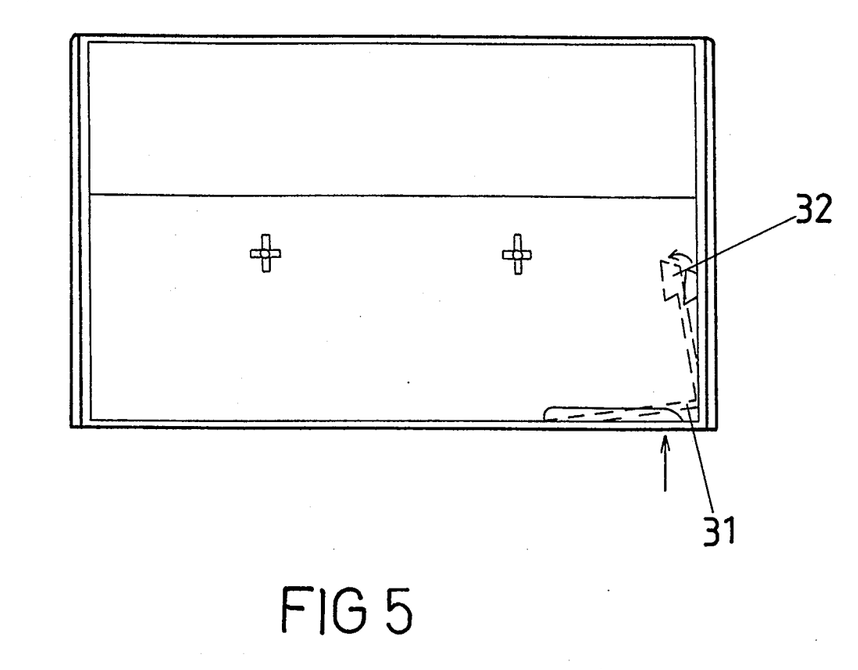
FIG. 5 is a schematic (top) view of the invention.
Figure 7A:
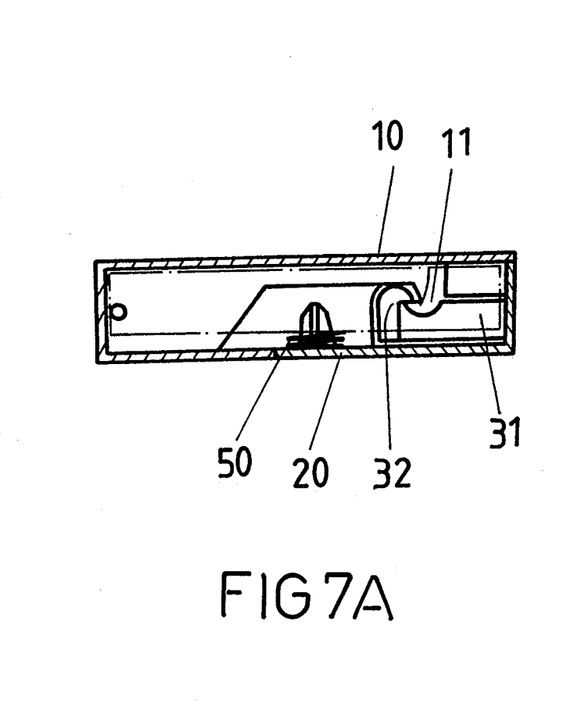
FIG. 7A is a side, cross-sectional view of an alternative embodiment with an elastic member shown in the closed position.
Figure 7B:
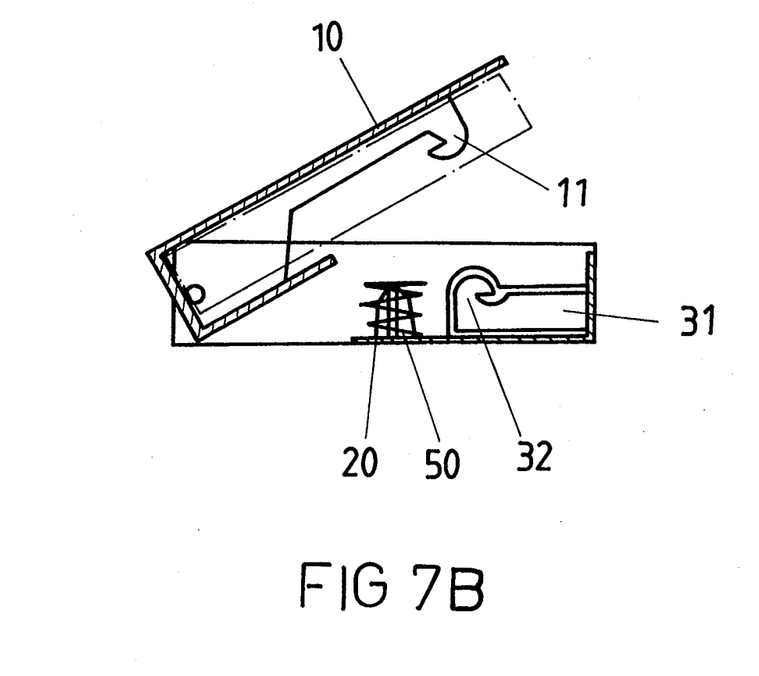
Figure 9:
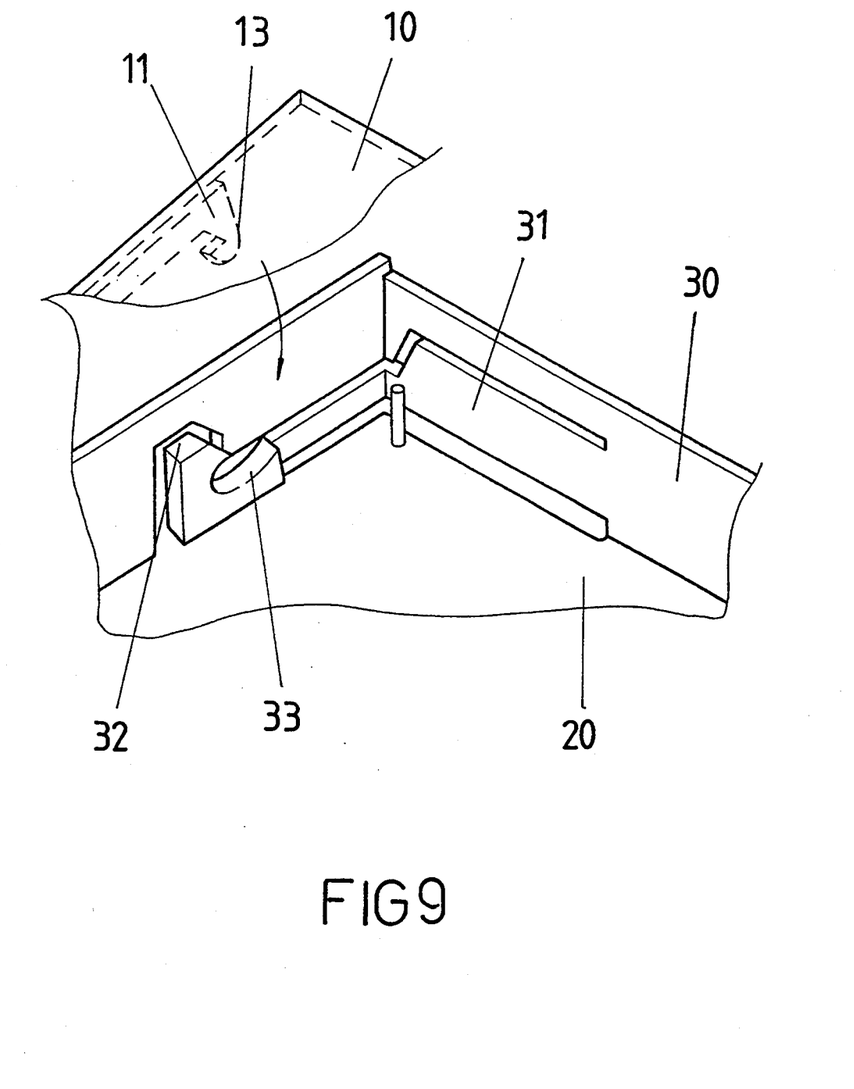
FIG. 9 is a partial perspective view of the embodiment of FIG. 3 with a position-limitation post.

By means of the structure device above, the motion and function of the invention in use are as follows: now referring to FIG. 2, 4, and 5 again, when cover 10 is closed (as shown in FIG. 4B), positioning hook 11 of the cover 10 just retainedly matches with the positioning block 32 at the end of the coupled moving lug 31. So cover 10 can be restricted by the hook 11, and will not be opened by mistakes. Thus the cover 10 has a function to prevent the tape being dropped off. When you want to open the cover 10 and take the tape out, as shown in FIG. 2,4A, and FIG. 5, you can handle the case 20 by one hand and use your finger to push a little down the coupled moving lug 31 and the coupled moving lug 31 will biasly extend out at a slant angle. So the positioning block 32 will bias from the retaining position and does not retain with the positioning book 11 of the cover 10. The slant pushing surface 33 of the coupled moving lug 31 will contact the arc side 13 of the positioning hook 11 and it has the function of pushing the positioning hook 11 and cover 10. At the same time when your other fingers pull the cover 10 open, the cover 10 can be opened by a single hand. If you want the cover 10 to open more automatically, as shown in FIG. 7, there can be disposed at least one elastic member 50 at a proper position on the case 20. When the positioning hook 11 gets off the positioning block 32, the cover 10 will lift automatically and the case will open. To prevent the coupled moving lug 31 from being broken by users who presses it too strongly, (as shown in FIG. 9) a position-limiting post 70 can be disposed at a proper position on the case 20. So when the coupled moving lug 31 is pushed with too much force, it will contact the position-limiting post 7 and be stopped by it so that the post 70 can protect the coupled moving lug 31 from being moved too far and being broken.

Figure 6:
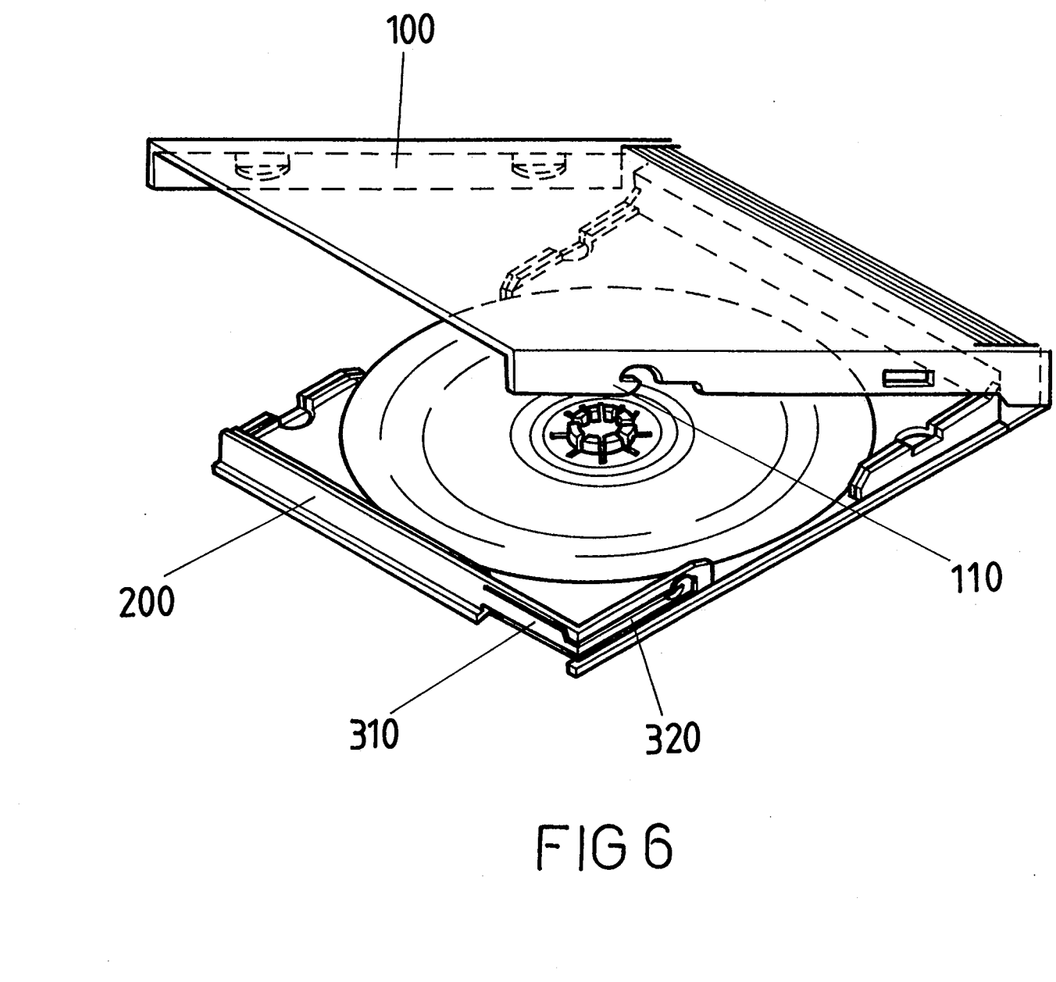
FIG. 6 is a schematic view of a CD case, a preferred embodiment of the invention.
Figure 8A:
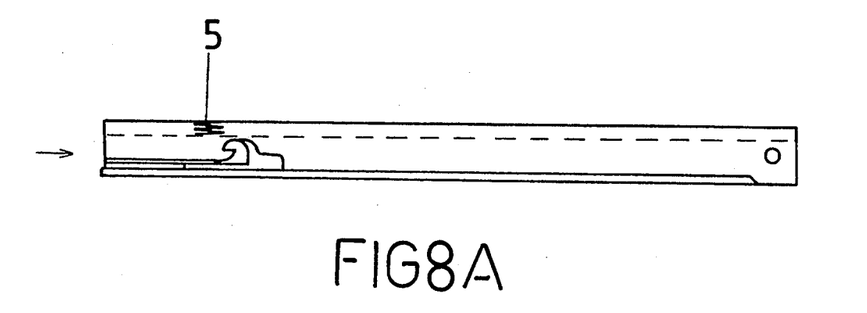
FIG. 8A is a side view of the CD case embodiment with an elastic member shown in the closed position.
Figure 8B:
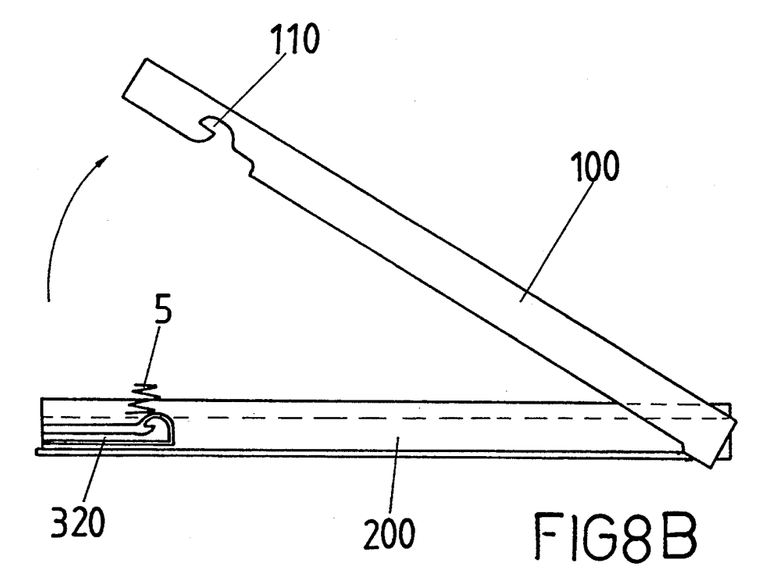
FIG. 8B is a side view similar to FIG. 8A showing the case in an open position.
Figure 8C:
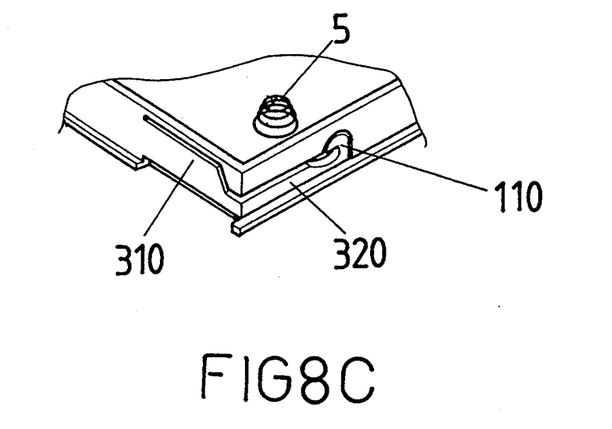
FIG. 8C is a partial perspective view of the case shown in FIGS. 8A and 8B.
Figure 10:
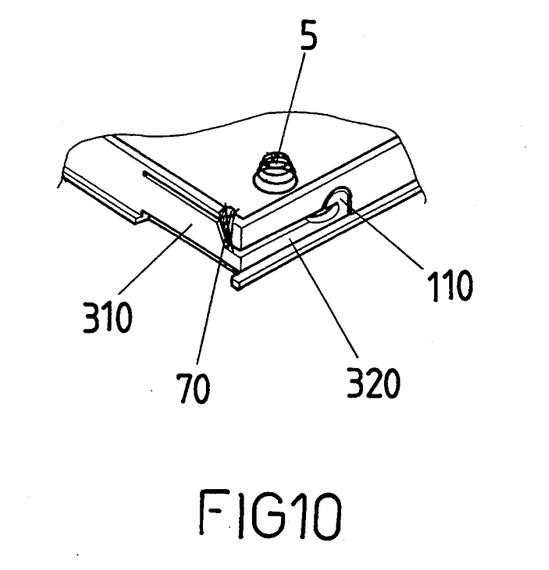
FIG. 10 is a partial perspective view of the embodiment having a position limiting post shown in FIG. 8.

According to the same principle, a CD case can have the same structure, as shown in FIG. 6, 8, a positioning hook 110 is disposed at a proper position on the upper cover 100 of the CD case. A positioning block 320 of the coupled moving lug 310 is disposed at a proper position corresponding to the positioning hook 110 so that the upper cover 100 can retain to the case 200. Of course, at least one elastic member 5 can be disposed on a proper position on the case to help lift the upper cover 100. Moreover, as shown in FIG. 10, dispose a position-limiting post 70 at a proper position on the case 200 to limit the position-moving angle of the coupled moving lug 310 and prevent the coupled moving lug 310 from being moved too far and being broken by users who presses it too strongly.

I claim:

1. An easy opening case configured to store an audio reproducing medium such as a cassette tape or a compact disc, the case comprising:
   a) a case base having at least two adjacent sidewalls;
   b) a cover pivotally attached to the base so as to be movable between closed and open positions, the cover having a hook thereon, the hook having an arcuate surface thereon;
   c) a resiliently moving lug on one of the at least two adjacent sidewalls so as to move relative to the one sidewall; and,
   d) a hook shaped positioning block on the moving lug so as to move therewith, the hook shaped positioning block having a pushing surface and located such that it engages the hook to hold the cover in its closed position wherein movement of the moving lug relative to the one sidewall disengages the hook shaped positioning block from the hook and causes the pushing surface to engage the arcuate surface of the hook to urge the cover toward its open position.

2. The easy opening case of claim 1 further comprising a spring acting on the cover to urge it toward its open position.

3. The easy opening case of claim 1 wherein the moving lug extends adjacent to both of the two adjacent sidewalls.

4. The easy opening case of claim 1 further comprising a position limiting post located so as to contact the moving lug and thereby limit the movement of the moving lug.

* * * * *